Figure 6:
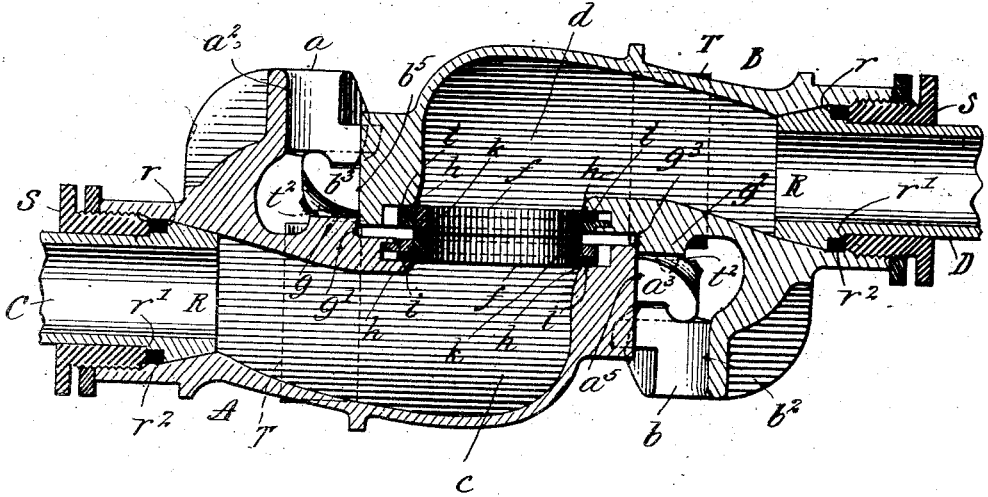

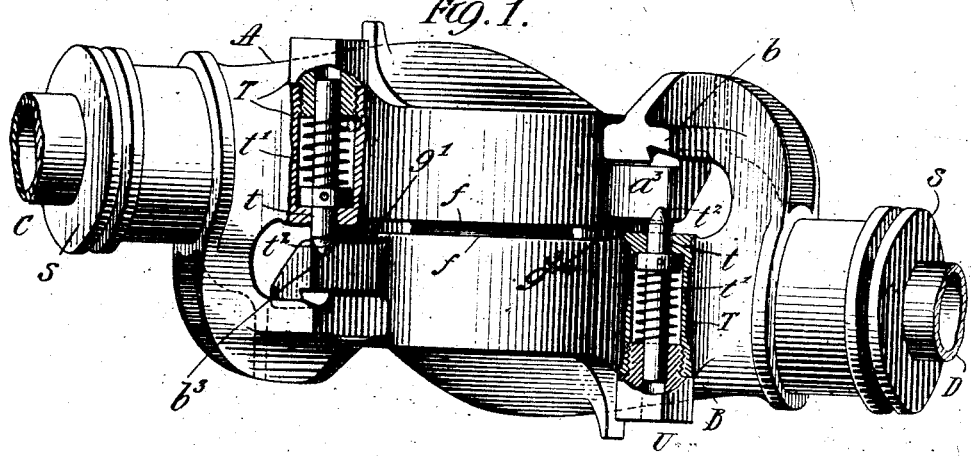
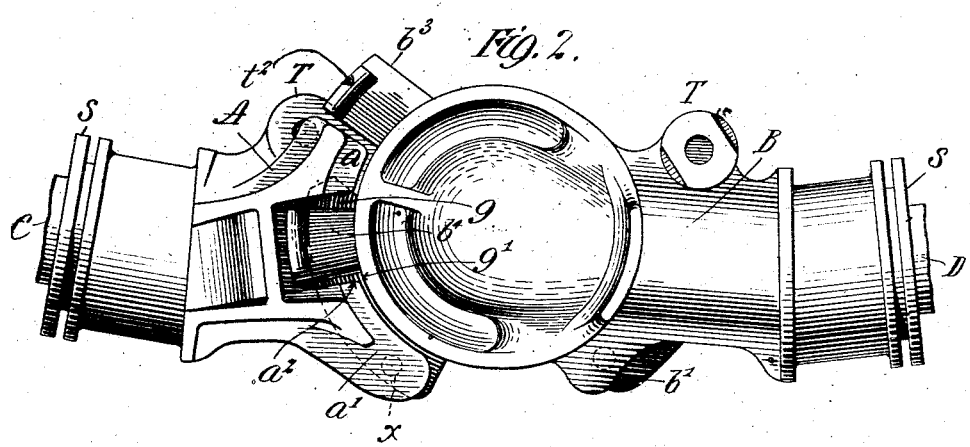
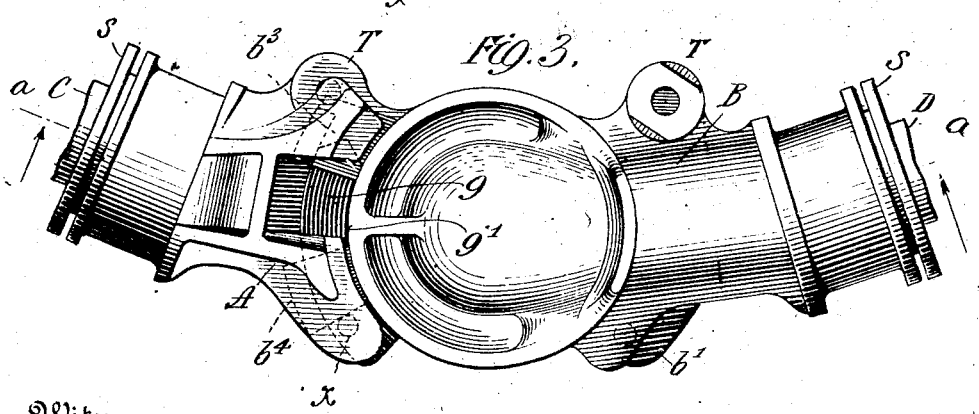

C. FORTH.
PIPE COUPLING.
APPLICATION FILED APR. 11, 1910.
1,035,565.
Patented Aug. 13, 1912.
3 SHEETS—SHEET 2.
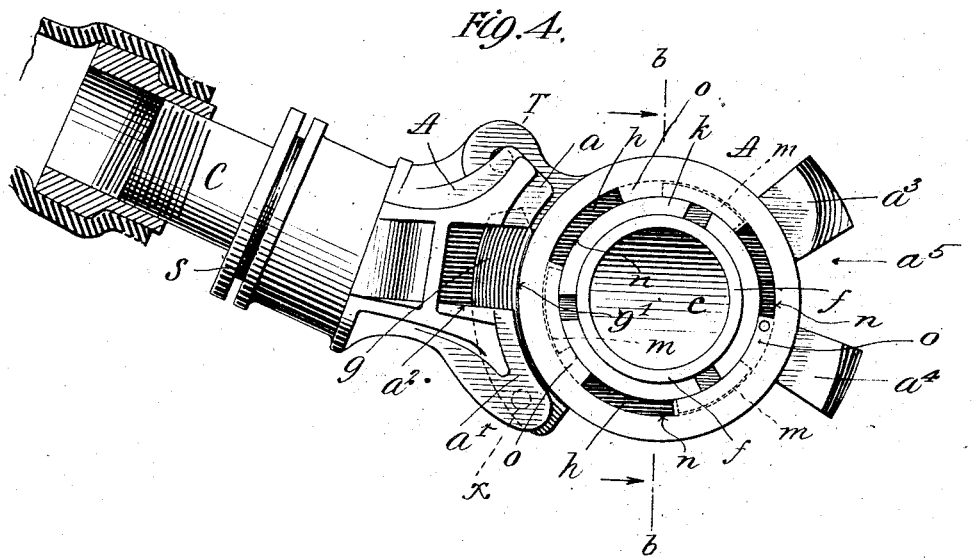
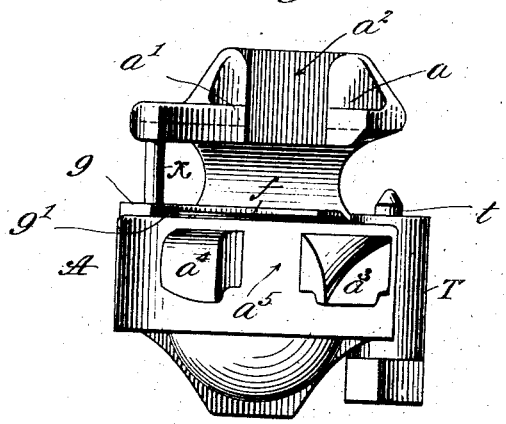
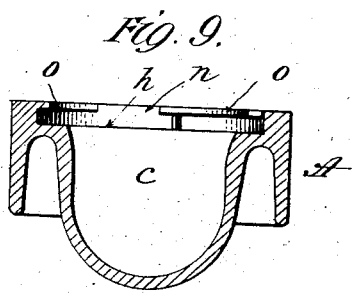
Witnesses:
Inventor
Charles Forth
By his Attorneys
Rogers & Kennedy

C. FORTH.
PIPE COUPLING.
APPLICATION FILED APR. 11, 1910.

1,035,565.

Patented Aug. 13, 1912.
3 SHEETS—SHEET 3.

Witnesses:

Charles Forth, Inventor
By his Attorneys

UNITED STATES PATENT OFFICE.

CHARLES FORTH, OF BOSTON, MASSACHUSETTS.

PIPE-COUPLING.

1,035,565.     Specification of Letters Patent.     Patented Aug. 13, 1912.

Application filed April 11, 1910. Serial No. 554,811.

*To all whom it may concern:*

Be it known that I, CHARLES FORTH, a citizen of the United States, residing at Boston, in the county of Suffolk and State of Massachusetts, have invented certain new and useful Improvements in Pipe-Couplings, of which the following is a specification, reference being had therein to the accompanying drawing.

This invention relates to pipe couplings of the type usually employed in train pipe systems to connect the terminals of the pipes on adjacent cars, such couplings in their most familiar and well-known form comprising usually two coupling heads formed with chambers therein with communicating ports provided with gaskets, said gaskets being adapted to contact with each other when the coupling heads are connected face to face, and serving to form a liquid-tight joint between the heads. The connection of the two heads is effected usually by the engagement of parts on the respective heads, in the form of a lug and keeper on one head adapted by a relative turning movement of the heads, to engage and interlock respectively with a keeper and lug on the companion head, the said parts when interlocked acting to draw the two heads tightly together and effect the compression and tight connection of the gaskets. In their coupled condition, the heads on the ends of the pipes of adjacent cars hang down between the cars at angular relations to each other, their uncoupling being effected either manually, or automatically by end strains on the pipe terminals. In the manual uncoupling action, the two heads are turned with a relative rotary motion until the lugs are wholly disengaged from the keepers, whereupon the heads will fall apart. The automatic disconnection is effected by an endwise pull on the heads when the coupling between the cars becomes accidentally disconnected or when there is a failure to manually disconnect the coupling heads before the cars are uncoupled. Under such conditions, the separating cars will pull forcibly endwise on the coupling heads, causing them to straighten out to a horizontal position, and the strain continuing, the contacting gaskets will yield sufficiently to allow the lugs to escape from the keepers before these parts have been fully disengaged by a normal uncoupling action. In practice, couplings of this character, operating as above described, are objectionable, first, because of the extent of the relative turning movement of the heads to manually uncouple them, necessitating such frequent bends of the flexible pipe terminals that they soon become worn and ruptured; and secondly, because of the fact that the parts are adapted to be forcibly drawn apart by endwise strain, the train attendants resort to such means to uncouple the heads without taking the trouble to manually uncouple them by disengaging the lugs and keepers in the proper manner.

My invention is designed to overcome these objections, and it consists primarily in providing each of the heads with a plurality of lugs and with a plurality of keepers, so that but a slight relative movement of the two heads will be necessary to engage or disengage the keepers and lugs on one head respectively with the lugs and keepers on the companion head. As a result of this construction, the bending of the pipe terminals to connect or disconnect the heads will be reduced to a minimum and wear on such parts correspondingly reduced. Furthermore, when the heads are subjected to end pull, under abnormal conditions, such as the breaking of the car couplers or their accidental disconnection, the relative movements of the heads on straightening out in assuming a horizontal position, will be sufficient to disengage the lugs and keepers from each other and allow the heads to separate, and this without forcibly compressing the gaskets and pulling the lugs from the keepers.

The invention consists also in the details of construction and combination of parts hereinafter described and claimed.

Figure 7:
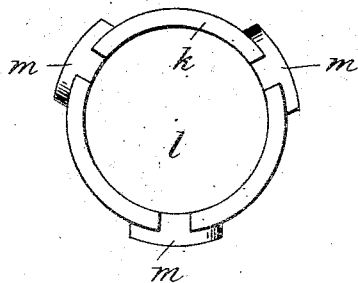
Figure 8:

In the accompanying drawings:—Figure 1 is a plan view of two coupling heads constructed in accordance with my invention and in coupled condition. Fig. 2 is a side elevation of the same with the lugs and keepers disengaged preparatory to the lateral separation of the heads. Fig. 3 is a similar view with the heads coupled together and the lugs and keepers interlocked. Fig. 4 is a face view of one of the coupling heads. Fig. 5 is an end elevation of the same. Fig. 6 is a longitudinal section through the two coupled heads, on the line $a$—$a$ of Fig. 3. Fig. 7 is a plan view of the gasket clamping ring. Fig. 8 is an edge view of the same. Fig. 9 is a detail section showing the cam surfaces on the head with which the clamping ring coöperates.

Referring to the drawings: My coupling comprises complementary coupling heads A and B adapted to be connected with the ends of the pipe terminals C and D, and provided as usual with openings or ports $c$ and $d$ through their inner sides, having gaskets $f$ seated therein, so that when the heads are connected together face to face, as shown in Fig. 6, the gaskets will meet and a connecting passage will be formed between the pipes.

The head A is provided at one side of its inner face with a plurality of overhanging keepers, two in the present instance, $a$ and $a'$, arranged side by side in a circumferential direction, and separated by a space $a^2$. At its opposite side, the head is provided with a plurality of radially extending lugs, two in the present instance, $a^3$ and $a^4$, which lugs are separated circumferentially by a space $a^5$. The companion head B is likewise provided on one side with two overhanging keepers $b$ and $b'$, separated by a space $b^2$, and on its other side with two radial lugs $b^3$ and $b^4$, separated by a space $b^5$, the said lugs and keepers on the two heads being adapted to be engaged with each other by a relative turning motion of the heads and being so formed on their adjacent engaging faces that by their engagement the two heads will be drawn forcibly together. In assembling the heads to lock them together, they are placed opposite to each other with the lug $b^4$ of head B opposite the space $a^2$ between the keepers on head A, and the lug $a^4$ of head A opposite the space $b^2$ on head B, and in this position of the parts, the two heads are pushed together, the result being that the lug $b^4$ and the lug $a^4$ on the respective heads will enter the respective spaces between the keepers of the opposite heads, and the heads being turned relatively to each other, the two lugs on each head will slide beneath the two keepers of the companion head, thereby drawing the heads firmly and forcibly together. It is seen, therefore, that the turning movement necessary to effect the complete locking of the heads is very slight, corresponding to the circumferential width of the lugs, and is therefore much less than would be necessary if the lugs were continuous with each other and the keepers likewise continuous.

The couplings, when applied to the pipe terminals of adjacent cars, hang down when coupled together, between the cars and occupy an angular position relative to each other. In the manual uncoupling of the heads, they are turned on each other until they are in line horizontally so as to disengage the lugs and keepers, and as this disengaging action may be effected by but a slight movement of the heads corresponding to the circumferential width of the individual lugs and keepers, the flexible pipes are subjected to but a slight bending and will consequently not wear out or become injured as they would if the forms of the lugs and keepers were such as to require an extended movement to disengage them. This limited movement to disengage the parts is made possible by the fact that the keepers are spaced apart to admit one of the lugs on the opposite head, so that all of the lugs and keepers may be engaged by a movement of the heads sufficient only to turn the lugs circumferentially beneath the keepers. Furthermore, it will be seen that although the full engagement of the parts is effected by a limited movement as described, nevertheless in the aggregate the engaging surfaces are of substantially the same extent as if the lugs and keepers were continuous and not divided. As a further result of the construction described, it will be seen that when the couplings are subjected to end strain, such as would occur under abnormal conditions, as in the event of the cars parting or of the failure to manually disconnect the coupling heads before uncoupling the cars, such end strains will draw the pipes and coupling heads up to a horizontal position, thereby turning the heads on each other a sufficient extent to wholly disengage the lugs and keepers, the result being that the heads will be automatically uncoupled.

It will be observed that the strain on the coupling heads which would be brought about under abnormal conditions, for instance in the event of the accidental uncoupling of the cars, or otherwise, is applied through the terminal or nipple portions C of the heads, and it will be further observed that recesses $a^2$ and $b^2$ on the respective heads are arranged opposite or substantially in line with the stems $c$. By reason of this relative location of the stems and recesses, the lugs $a^4$ and $b^4$, after they have been turned opposite the recesses $a^2$ and $b^2$ in the uncoupling action, can be withdrawn from these recesses by a facewise movement of the heads in the direct line of the endwise strains on the terminal C. This feature of the construction I deem of importance in that it brings about an automatic uncoupling of the heads by an endwise strain on the pipe terminals, the first part of the automatic action being a circumferential movement of the heads, one relative to the other as they are drawn up toward a horizontal position, in which circumferential movement the lugs $a^4$ and $b^4$ will be freed from engagement with the keepers and will aline with the openings $a^2$ and $b^2$, and the second part of the automatic uncoupling being an endwise separation of the heads, in which the lugs $a^4$ and $b^4$ will be drawn longitudinally out of their respective recesses.

In order that when the lugs and keepers are engaged with each other they will be held in engagement and prevented from accidentally disengaging by a relative lateral motion, which would be permitted if the heads were allowed to compress the gaskets, I provide head A with a stop shoulder or ledge $g$ extending outwardly from the face of the head beneath the keepers thereon, the inner edge $g'$ of the shoulder being curved so as to form a guide or abutment for the outer curved edge of the companion head B, the purpose of which will presently appear. The head B is likewise provided with a shoulder or ledge $g^2$ extending outwardly from its face beneath the keepers thereon, the inner edge $g^3$ of this shoulder being curved to form a guide and abutment for the outer curved edge of the head A. The form of these stop shoulders and their relations to the lugs and keepers are such that when the lugs are engaged beneath the keepers, the opposite sides of the lugs will engage the two shoulders and by said shoulders will be firmly held outwardly in interlocked engagement with the keepers, the said shoulders at the same time limiting the further approach of heads toward each other and preventing the gaskets from yielding any further than their initial compression. In the coupling action, when the heads are first placed face to face, the outer curved edge of one head adjacent its lugs will abut against the curved stop shoulder on the other head, so that when the two heads are turned, they will be guided and caused to rotate on an axis common to the curves of the engaging shoulders and edges of the heads. This action is of particular importance and advantage in the uncoupling of the heads, for the reason that if they are not compelled to turn relatively on a common axis, the lugs and keepers on one side might be disengaged while those on the other side might remain interlocked. This objectionable action would take place if, for instance, one of the heads was swung or fulcrumed on the other at one side where the lugs and keepers are engaged, such swinging being sufficient to shift the opposite lugs and keepers far enough for their disengagement from each other, while those on the other side would remain in engagement, and great difficulty would be encountered in finally freeing the engaging parts. By reason of the fact that the curved edges of the shoulders abut against the curved edges of the heads, as described, when the heads are turned to disengage them, they will be compelled to move around a common central axis, with the result that the lugs and keepers on the respective heads will move the same distance and assume simultaneously a position where all of the parts are free to be separated sidewise.

In order that the gaskets may be readily applied to or removed from the heads, and in order that when in place there will be no liability of the fluid leaking between them and their seats, I provide the port with an inwardly extending annular ledge $h$ and form the gasket at its base with an outwardly extending flange $i$ seated on the ledge and adapted to be firmly held thereto by a clamping ring $k$ of the form shown more particularly in Figs. 6, 7 and 8. This clamping ring is formed centrally with an opening $l$ to receive the outwardly projecting portion of the gasket and is provided with a number of outwardly extending projections $m$ having cam surfaces on their upper sides. These projections are adapted to be passed through notches or spaces $n$ in an annular shoulder $o$ projecting inwardly from the sides of the port and overhanging the ledge, which shoulders are formed on their undersides with cam-surfaces adapted to coöperate with those on the projections on the ring, and acting when the projections are passed through the notches and turned beneath the shoulders, to force the ring down onto the gasket flange. By this means, it will be seen that the gasket is mounted removably in the head and, when seated in place, is clamped firmly and tightly to its seat. There will, therefore, be no liability of the gasket shrinking or working away from its seat, as would be the case if it were simply compressed and then allowed to expand in its seat, as has been the custom heretofore. In removing the gasket for its replacement by a new one, it is but necessary to release the clamping ring by a turning movement and disengage the cam-surfaces and bring the radial projections in the ring opposite the notches in the overhanging shoulder on the head, whereupon the ring may be withdrawn from the socket. As shown more particularly in Fig. 6, it will be seen that the diameter of the port is somewhat greater than the opening through the gasket, the result being that a considerable surface of the latter is exposed to the pressure of the fluid passing through the coupling. The pressure acting on the exposed surfaces of the gasket will act to force the gasket outwardly and maintain a close contact between the meeting ends of the gaskets.

In order that when the heads are coupled together they may be restrained from too freely uncoupling, I provide a locking device adapted when the heads are in coupled condition to hold them coupled against abnormal conditions which might uncouple them, said device being so arranged that when the parts are subjected to undue force the locking device will yield. This device may be of many different forms, but I prefer to adopt the construction shown in the drawings, where it will be seen that the head A is provided on one side with a guiding opening or socket T, in which is mounted a sliding pin $t$ acted on by a spring $t'$ seated in the socket and encircling the pin and tending to normally project the end of the same beyond the socket. The projecting end of the pin is beveled and adapted when the lug $b^4$ on the companion head is turned beneath the keeper $a'$ on head A, to yield as the incline or bevel $t^2$ on the lug $b^3$ is moved past the end of the pin, and when the lug $b^4$ is fully engaged and brings up against a stop pin $x$ on the head B, the pin will spring out behind the lug $b^3$ and hold the parts in full interlocked engagement. In this manner, the pin will act to prevent the heads from readily turning and becoming disengaged, but by the exertion of considerable force, either manually or when the heads are subjected to endwise pull, the pin will be automatically forced back in its socket by the engagement of its beveled end against the lug $b^3$, and in this way the lugs may, by the continued turning movement of the heads, be disengaged from the keepers. If desired, a similarly formed locking device U may be applied to head B in position to engage lug $a^3$ on head A and operating with the same functions as that just described.

I prefer to so connect the heads with the pipe terminals that the heads may swivel with reference to the said terminals. This is effected by the construction shown in Fig. 6, where it will be seen that the pipe terminal is provided with a nipple R, having its end beveled so as to fit a correspondingly formed socket in the head, the end of the nipple adjacent the beveled portion being formed with two annular shoulders $r$ and $r'$. A locking nut S loosely encircles the nipple and is threaded to engage internal threads of the socket, the inner end of the nut being adapted to bear against the shoulder $r'$ on the nipple. To form a liquid-tight joint between these parts, a soft packing ring $r^2$ is seated around the nipple between the shoulders thereon and rests on the shoulders $r$, thereby closing the space between the nipple and the socket. When the nut S is screwed up, it, by engaging the shoulder $r'$ on the nipple, forces the same down and seats its beveled end in the socket in the head, the soft packing $r^2$ at the same time being firmly compressed between the shoulder $r$ and the end of the nut. The shoulder $r'$ acts as a stop for the end of the nut and prevents the latter from crushing the soft packing against its seat.

In the foregoing description and accompanying drawings I have described and shown my invention in the form which I prefer to adopt, and which in practice has been found to answer to a satisfactory degree the ends to be attained. It will be understood, however, that the invention is susceptible of embodiment in other forms and is not limited to any particular construction or details except in so far as such limitations are specified in the claims.

Having thus described my invention, what I claim is:—

1. In an automatically separating side port pipe coupling, the combination of coupling heads provided each with two keepers with a space between them, and provided also each with two lugs, one of the lugs on each head being adapted to be inserted in the space between the keepers on the other head, and the said lugs on one head being adapted by the relative movements of the heads to be interlocked with the keepers on the other head, a stop shoulder on each head adapted to engage behind the lugs on the opposite head when the lugs and keepers are interlocked, the said heads being provided with means for the attachment thereto of the pipe terminals, said means being arranged in line or substantially so, with the recesses on the respective heads; whereby, when the lugs arrive opposite the recesses in the uncoupling movement of the heads, the said lugs will be automatically withdrawn longitudinally from the recesses by the endwise strain of the pipe terminals.

2. In a pipe coupling, the combination of coupling heads provided each with a lug and an overlying keeper adapted by a rotary movement of the heads to be interlocked, and circumferential guiding shoulders on the respective heads located beneath and opposite the keepers and between which guiding shoulders and keepers the lugs are adapted to engage, the guiding shoulder on one head being adapted to be engaged by the inner side of the lug on the other head and by the edge of said head and said parts when so engaged acting to prevent the heads from tipping relatively to each other, but permitting the same to be automitically turned relatively to each other in an uncoupling direction.

In testimony whereof I have affixed my signature in presence of two witnesses.

CHARLES FORTH.

Witnesses:
 FRANK G. PARKER,
 JOHN BUCKLER.